US012003056B2

United States Patent
Kozono et al.

(10) Patent No.: US 12,003,056 B2
(45) Date of Patent: Jun. 4, 2024

(54) CONNECTOR

(71) Applicant: Yazaki Corporation, Tokyo (JP)

(72) Inventors: Seiji Kozono, Kakegawa (JP);
Yoshitaka Tsushima, Fujieda (JP);
Masaya Okamoto, Fujieda (JP)

(73) Assignee: Yazaki Corporation, Tokyo (JP)

( * ) Notice: Subject to any disclaimer, the term of this patent is extended or adjusted under 35 U.S.C. 154(b) by 331 days.

(21) Appl. No.: 17/682,642

(22) Filed: Feb. 28, 2022

(65) Prior Publication Data

US 2022/0278478 A1     Sep. 1, 2022

(30) Foreign Application Priority Data

Mar. 1, 2021   (JP) ................. 2021-031856

(51) Int. Cl.
*H01R 13/504*     (2006.01)
*H01R 13/453*     (2006.01)
*H01R 13/514*     (2006.01)

(52) U.S. Cl.
CPC ..... *H01R 13/5045* (2013.01); *H01R 13/4532* (2013.01); *H01R 13/514* (2013.01)

(58) Field of Classification Search
CPC ............................ H01R 13/502; H01R 13/504; H01R 13/5045; H01R 13/506; H01R 13/44; H01R 13/447; H01R 13/453; H01R 13/4532; H01R 13/514; H01R 13/516; H01R 13/518

USPC ......................... 439/152, 153, 157
See application file for complete search history.

(56) References Cited

U.S. PATENT DOCUMENTS 5,716,224 A     2/1998  Masuda et al.
2022/0278478 A1* 9/2022  Kozono ............. H01R 13/5045

FOREIGN PATENT DOCUMENTS

JP     H08-138785 A    5/1996
WO     2017/116933 A2  7/2017

* cited by examiner

*Primary Examiner* — Khiem M Nguyen
(74) *Attorney, Agent, or Firm* — Banner & Witcoff, Ltd.

(57) ABSTRACT

There is provided a connector configured by a first connector and a second connector which are fitted and electrically connected to each other. The first connector includes a projecting portion extending toward the second connector. The second connector includes: a terminal; and a cap configured to cover a front surface of the terminal and having a folding mechanism. A cover portion of the cap includes: a first cover portion provided with a rotating shaft; a second cover portion adjacent to the first cover portion and provided with a rail pin; and a connection portion that rotatably connects the first cover portion and the second cover portion to each other. The rail pin is configured to move along a rail in response to the contact portion being pressed and/or released by the projecting portion.

2 Claims, 8 Drawing Sheets

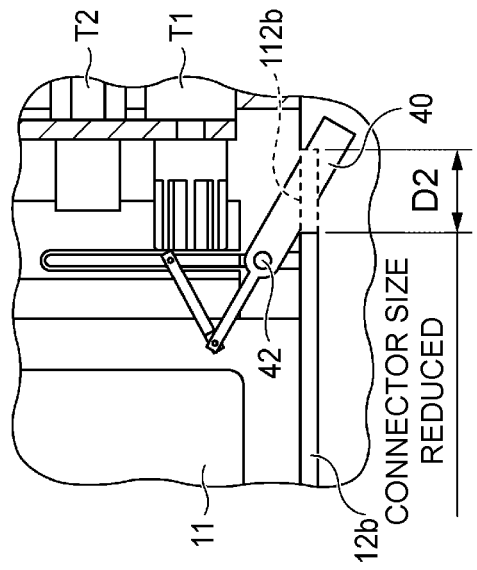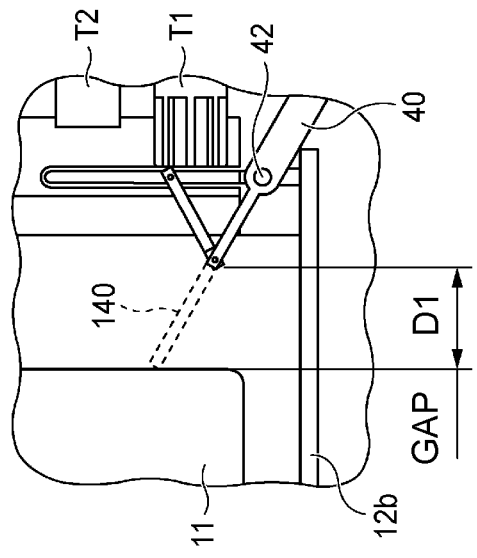

CONNECTOR

CROSS-REFERENCE TO RELATED APPLICATIONS

This application is based on and claims priority under 35 USC 119 from Japanese Patent Application No. 2021-031856 filed on Mar. 1, 2021, the contents of which are incorporated herein by reference.

TECHNICAL FIELD

The present disclosure relates to a connector.

BACKGROUND ART

Charging is performed by fitting a power feeding side connector to a power receiving side connector provided in an electric vehicle or a hybrid vehicle. A connector of this type is equipped with an openable and closable cap for the purpose of dustproofing, terminal protection, electric shock prevention to surroundings, and the like, and when the connector is not connected, the cap is closed to prevent terminals from being exposed (see, for example, JPH08-138785A).

In a connector described in JPH08-138785A, a cap that can rotate around a pin is provided on a housing of a power receiving side connector, and when the connector is fitted, an end of the cap is pressed by a tip portion (fitting hood portion) of a housing of a power feeding side connector. When the end of the cap is pressed, the cap rotates around the pin and opens, a terminal in the housing is opened and exposed, and the terminal can be connected to another terminal.

In the connector described in JPH08-138785A, a stroke (size) of the power feeding side connector is set such that a trajectory of the end of the cap that rotates around the pin does not interfere with a terminal accommodating wall located inside the fitting hood portion of the power feeding side connector. In other words, the size of the connector increases by a size of the cap (a distance between a mounting position of the pin on the cap and the end).

SUMMARY OF INVENTION

The present disclosure provides a connector with an openable and closable cap capable of reducing a space required for a stroke of the connector.

According to an illustrative aspect of the present disclosure, a connector includes: a first connector; and a second connector, the connector being configured by the first connector and the second connector which are fitted and electrically connected to each other. The first connector includes a projecting portion extending toward the second connector in a fitting direction of the first connector and the second connector. The second connector includes: a terminal extending in the fitting direction, a cap including a cover portion that covers a front surface of the terminal, a rotating shaft provided on an edge portion of the cover portion, and a contact portion extending to an opposite side to the cover portion from the rotating shaft and abutable on the projecting portion, a housing that supports the rotating shaft, and a rail pin. The cover portion includes a first cover portion provided with the rotating shaft, a second cover portion adjacent to the first cover portion and provided with the rail pin, and a connection portion that rotatably connects the first cover portion and the second cover portion to each other.

The housing includes a rail extending in a direction intersecting with the fitting direction. The rail pin is configured to move along the rail in response to the contact portion being pressed and/or released by the projecting portion.

The present disclosure has been briefly described as above. Details of the present disclosure will be further clarified by reading an aspect (hereinafter, referred to as an "embodiment") for implementing the present disclosure to be described below with reference to the accompanying drawings.

BRIEF DESCRIPTION OF DRAWINGS

FIGS. 8A and 8B are explanatory diagrams for comparing a cap according to a reference example with the cap of the embodiment.

DESCRIPTION OF EMBODIMENTS

A specific embodiment according to the present disclosure will be described below with reference to the accompanying drawings. As an example, a connector of the present embodiment is applied to a connector in which a power feeding side connector and a power receiving side connector of an electric vehicle or the like are fitted and electrically connected to each other.

Figure 1:
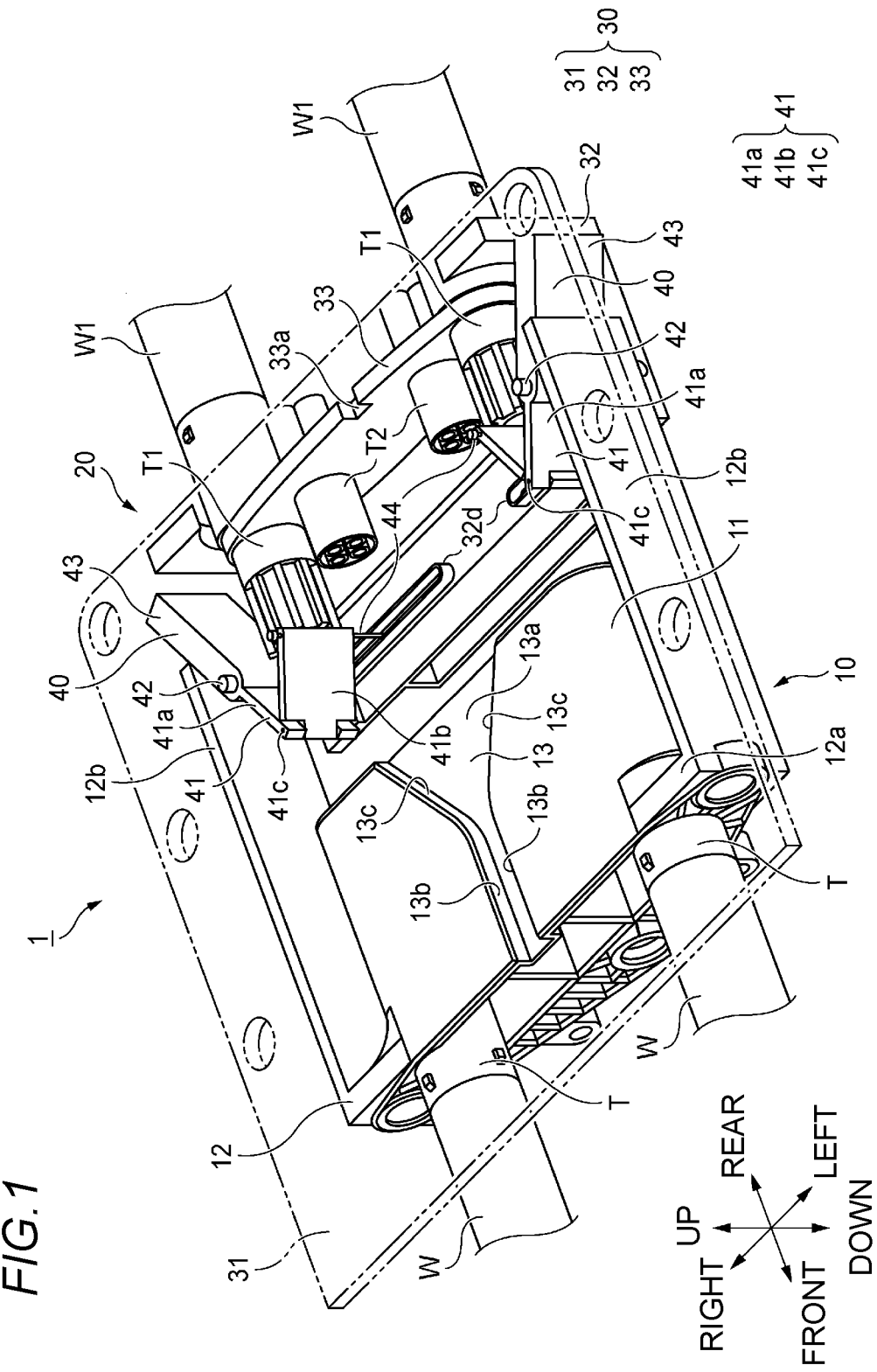
FIG. 1 is a perspective view of a connector according to an embodiment of the present disclosure.
Figure 2:
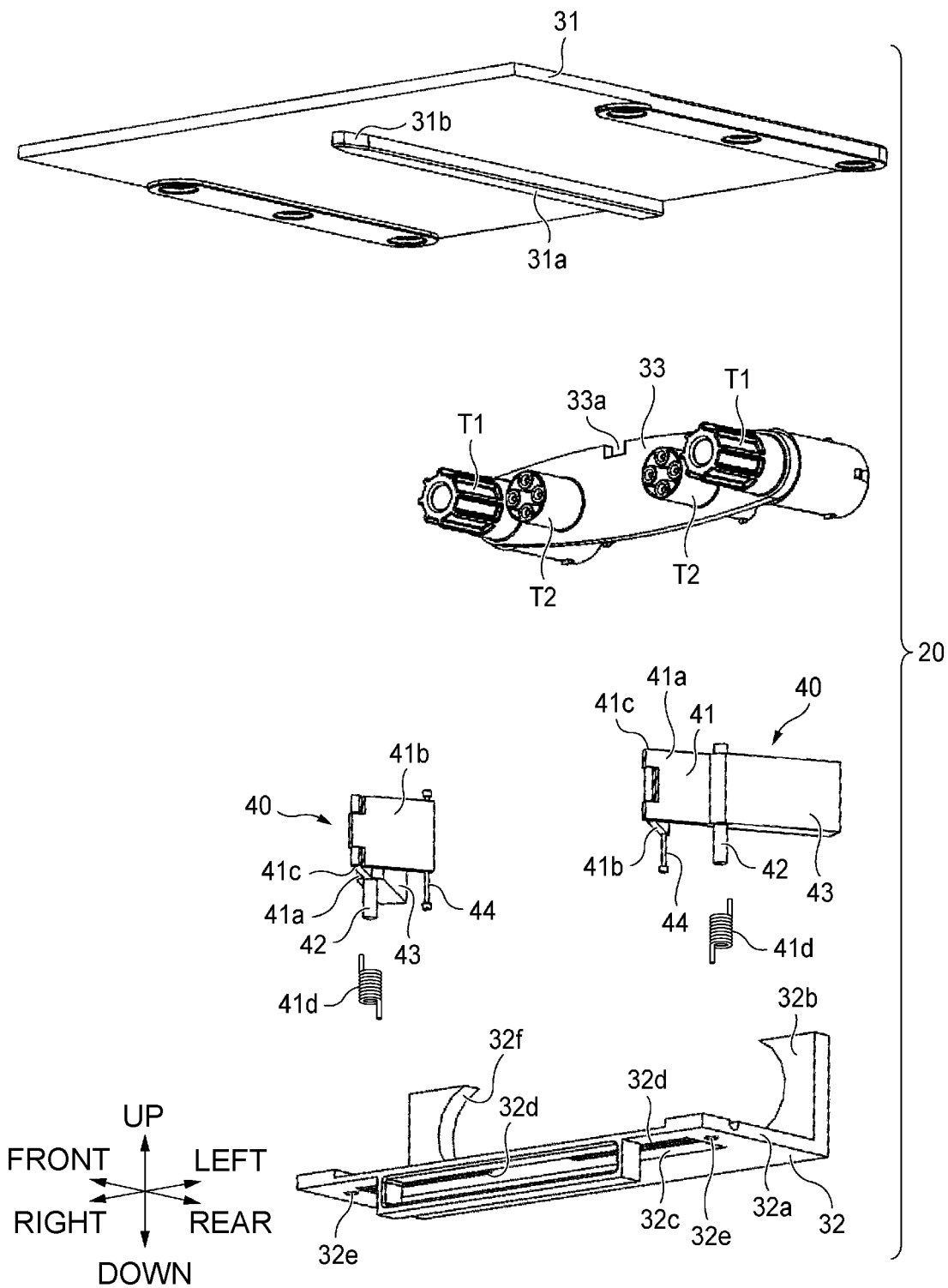
FIG. 2 is an exploded perspective view of a second connector shown in FIG. 1.

FIG. 1 is a perspective view of a connector 1 according to the embodiment of the present disclosure. FIG. 1 shows a state of a first connector 10 and a second connector 20 during fitting, and shows a state in which an upper housing 31 of the second connector 20 is perspective. FIG. 2 is an exploded perspective view of the second connector 20 shown in FIG. 1. Hereinafter, for convenience of explanation, "front", "rear", "left", "right", "up", and "down" are defined as shown in FIG. 1. A "front-rear direction", a "left-right direction", and an "up-down direction" are orthogonal to one another.

The connector 1 shown in FIG. 1 includes the first connector 10 and the second connector 20 that are fitted and electrically connected to each other. A plurality of terminals T are mounted on the first connector 10, and a plurality of terminals T1 and T2 connected to the plurality of terminals T are mounted on the second connector 20. The terminals T1 and T2 are provided on both left and right sides of the second connector 20. The terminal T1 has a diameter larger than that of the terminal T2, and for example, one power cable is connected to the terminal T1 and, for example, four communication lines are connected to the terminal T2. The plurality of terminals T of the first connector 10 are provided corresponding to the terminals T1 and T2. In FIG. 1, electric wires W and W1 connected to the terminals T and T1 are shown, and other electric wires connected to the terminals T2 and T are not shown.

The first connector 10 includes a housing 11 having arcuate sides extending in a front-rear direction of a rectangular parallelepiped shape. A rear side of the housing 11 is formed with openings into which the terminals T1 and T2 of the second connector 20 can be inserted, and a front side of the housing 11 is formed with openings into which the terminals T connected to the electric wires W can be inserted and mounted. The first connector 10 includes a U-shaped wall portion 12 when viewed in the up-down direction, which covers a front side and left and right sides of the housing 11. The wall portion 12 includes a front surface portion 12a and two projecting portions 12b. The front surface portion 12a has a substantially rectangular plate shape with a center in the left-right direction projecting downward, is attached to the front side of the housing 11, and is formed with openings through which the terminals T can be inserted. The two projecting portions 12b have a rectangular plate shape, and project from left and right ends of the front surface portion 12a toward the second connector 20 in a fitting direction of the first connector 10 and the second connector 20, that is, rearward. The first connector 10 includes a concave portion 13 on an upper surface of the housing 11. The concave portion 13 includes a bottom portion 13a parallel to the upper surface of the housing 11, left and right side wall portions 13b extending in the front-rear direction and connecting the bottom portion 13a and the upper surface of the housing 11, and hypotenuse portions 13c extending in a direction inclining in the front-rear direction from the side wall portions 13b, respectively. The left and right hypotenuse portions 13c are separated from each other toward a rear side, and the concave portion 13 has a substantially Y-shaped contour when viewed from above.

As shown in FIG. 2, the second connector 20 includes a housing 30, the plurality of terminals T1 and T2 mounted on the housing 30, and two caps 40 that can be opened and closed so as to cover front surfaces of the terminals T1 and T2. The housing 30 includes an upper housing 31, a lower housing 32 and a terminal holding portion 33.

The upper housing 31 has a substantially square plate shape, and includes a lower surface formed with a convex portion 31a that extends linearly from a rear end toward a front side. The upper surface of the upper housing 31 is attached to a vehicle body as an example. The convex portion 31a has a length of approximately three-quarters of one side of the upper housing 31, and includes a front end portion 31b that is gradually tapered toward the front side. When the first connector 10 and the second connector 20 are fitted to each other, the convex portion 31a guides the second connector 20 to a correct fitting position by sliding the front end portion 31b on the side wall portions of the concave portion 13 of the first connector 10.

The lower housing 32 is arranged below the upper housing 31 on a rear side of the upper housing 31. The lower housing 32 includes a substantially rectangular plate-shaped bottom surface portion 32a extending parallel to the upper housing 31, and a rear surface portion 32b extending vertically upward from a rear end of the bottom surface portion 32a, and the lower housing 32 has an L-shape when viewed in the left-right direction.

The bottom surface portion 32a includes a rectangular opening portion 32c extending in the left-right direction, and rails 32d extending from left and right side walls of the opening 32c toward a center of the opening 32c (in a direction intersecting the fitting direction of the first connector 10 and the second connector 20). Each rail 32d has a U-shape when viewed in the up-down direction. The bottom surface portion 32a is provided with holes 32e through which shaft pins 42 are inserted in left and right corner portions on a front side thereof.

The rear surface portion 32b includes an opening 32f hollowed out in a substantially elliptical shape in a center thereof.

As shown in FIG. 2, the terminal holding portion 33 is provided between the upper housing 31 and the lower housing 32, and holds the plurality of terminals T1 and T2. The terminal holding portion 33 is a plate-shaped member having a substantially elliptical shape when viewed in the front-rear direction, and is formed with openings through which the plurality of terminals T1 and T2 can be inserted. The terminal holding portion 33 includes a concave portion 33a corresponding to the shape of the convex portion 31a of the upper housing 31 in a center of an upper portion thereof.

The caps 40 are provided on both left and right sides of the housing 30, respectively, have a foldable structure (which may be called as a folding mechanism), and can be opened and closed so as to cover the front surfaces of the terminals T1 and T2 from the left and right sides. Each of the caps 40 includes a rectangular plate-shaped cover portion 41 that covers the front surfaces of the terminals T1 and T2, and a shaft pin 42 (rotating shaft) inserted through a through hole extending in the up-down direction provided at an edge portion of the cover portion 41. The cap 40 includes a rectangular plate-shaped contact portion 43 that extends to an opposite side of the cover portion 41 with the shaft pin 42 sandwiched between the cover portion 41 and the contact portion 43, and abuts on the projecting portions 12b of the first connector 10 when the first connector 10 and the second connector 20 are fitted to each other.

The cover portion 41 includes a first cover portion 41a provided with the shaft pin 42, a second cover portion 41b adjacent to the first cover portion 41a, and a cap pin 41c (connection portion) that rotatably connects the first cover portion 41a and the second cover portion 41b to each other. The first cover portion 41a includes a concave portion in a center of aside adjacent to the second cover portion 41b, and a side of the second cover portion 41b is formed with a convex portion corresponding to the concave portion. The first cover portion 41a and the second cover portion 41b are provided with through holes penetrating the concave portion and the convex portion. The cap pin 41c is inserted through this through hole, and the first cover portion 41a and the second cover portion 41b are rotatably connected to each other. The second cover portion 41b is provided with a through hole extending in the up-down direction on a side opposite to a side on which the cap pin 41c is attached, and a rail pin 44 is inserted through the through hole. A lower end of the rail pin 44 projects below the second cover portion 41b and is inserted into the rail 32d. A diameter enlarged portion is provided at both upper and lower ends of the rail pin 44 to prevent the second cover portion 41b and the rail 32d from coming off. The rail pin 44 moves along the rail 32d as the contact portion 43 is pressed and/or released by the projecting portion 12b.

Figure 7:
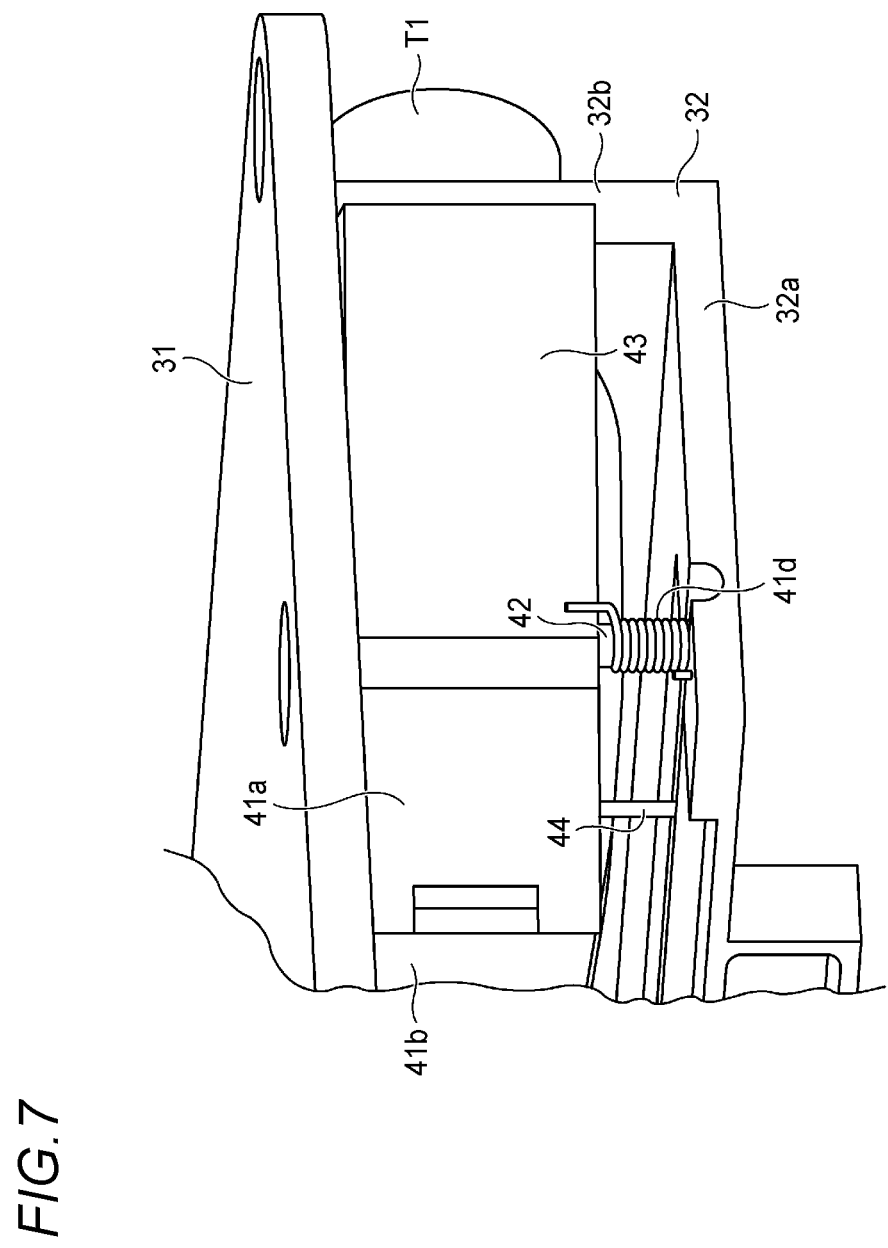
FIG. 7 is a perspective view showing the vicinity of a torsion coil spring that urges a cap in a closing direction.

A lower end of the shaft pin 42 is inserted into a hole provided in the lower housing 32, and an upper end thereof abuts on the lower surface of the upper housing 31 and is supported by the upper housing 31 and the lower housing 32. A torsion coil spring 41d (an urging member) is fitted to the lower end of the shaft pin 42. One end of the torsion coil spring 41d is fixed to the contact portion 43 of the cap 40, and the other end thereof is inserted and fixed to the bottom surface portion 32a of the lower housing 32 to urge the cap 40 in a closing direction (so that the contact portion 43 and the cover portion 41 extend along the left-right direction) (see FIG. 7). Since the cap 40 is urged in the closing direction by the torsion coil spring 41d, the cap 40 is maintained to be closed when the contact portion 43 is not pressed by the projecting portion 12b.

The cap 40 is in a closed state that covers the front surfaces of the terminals T1 and T2 by arranging the contact portion 43 and the cover portion 41 linearly along the left-right direction. When the contact portion 43 is pressed backward, the first cover portion 41a rotates around the shaft pin 42 in a direction away from the terminal T1. Following the rotation of the first cover portion 41aa, a side of the second cover portion 41b to which the cap pin 41c is attached (an edge portion, a side connected to the first cover part 41a) rotates. In this case, a side opposite to the second cover portion 41b (aside to which the rail pin 44 is attached) moves in a direction close to the shaft pin 42 as the rail pin 44 moves along the rail 32d. In this way, the cap 40 is opened so that the front surfaces of the terminals T1 and T2 are exposed while the cap 40 is folded so that the first cover portion 41a and the second cover portion 41b are close to each other with the cap pin 41c as a center.

Assembly of the second connector 20 will be described.

The terminal holding portion 33 holding the terminals T1 and T2 is fixed to the upper housing 31 by fitting the convex portion 31a of the upper housing 31 into the concave portion 33a. As shown in FIG. 1, the second connector 20 is constructed by inserting the shaft pin 42 of the cap 40 into the hole 32e of the bottom surface portion 32a so that the terminals T1 and T2 are located in the opening 32f of the lower housing 32, and attaching an upper portion of the rear surface portion 32b to the lower surface of the upper housing 31.

Figure 3:
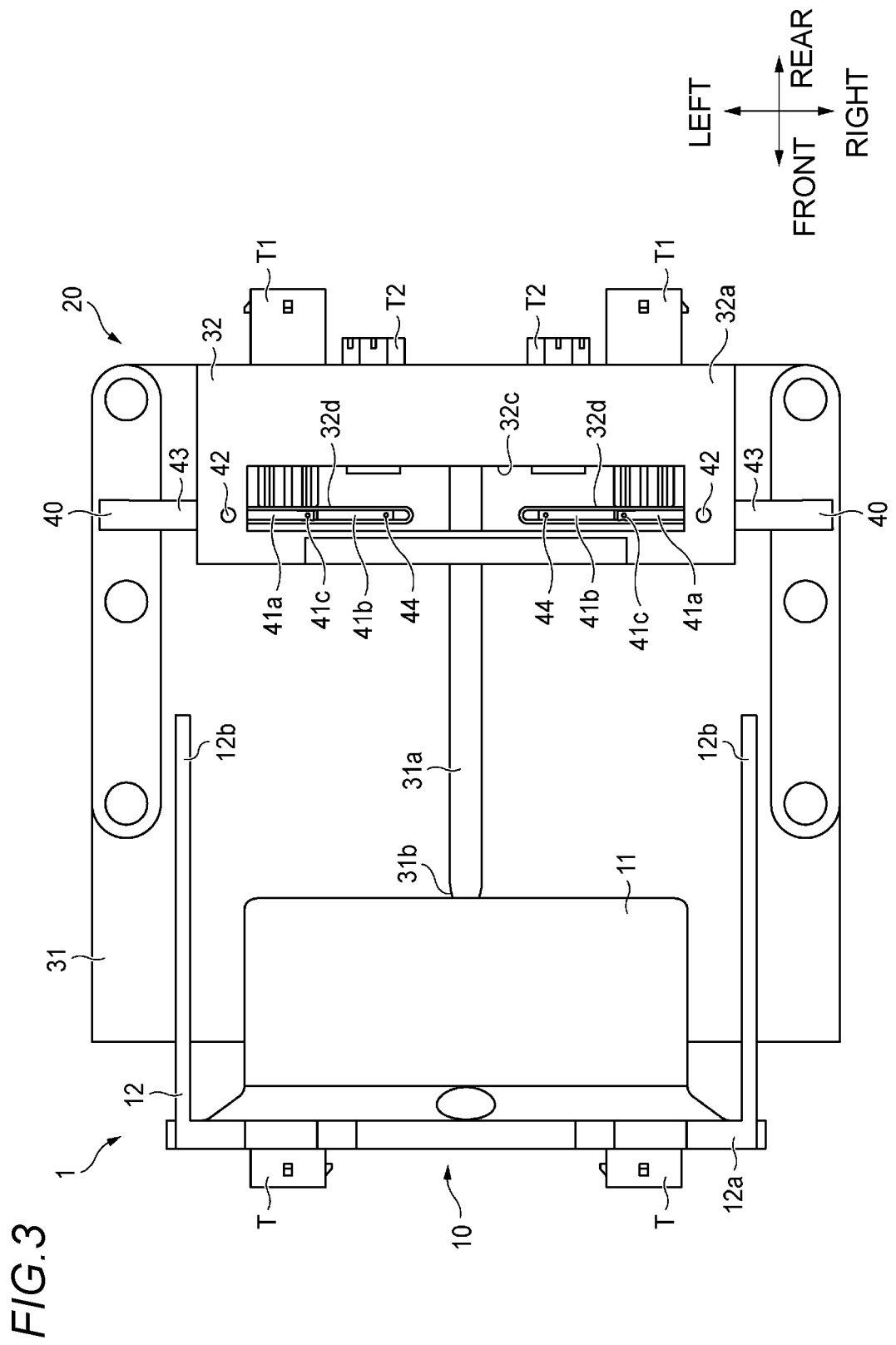
FIG. 3 is a bottom view showing a first connector and the second connector before fitting.
Figure 4:
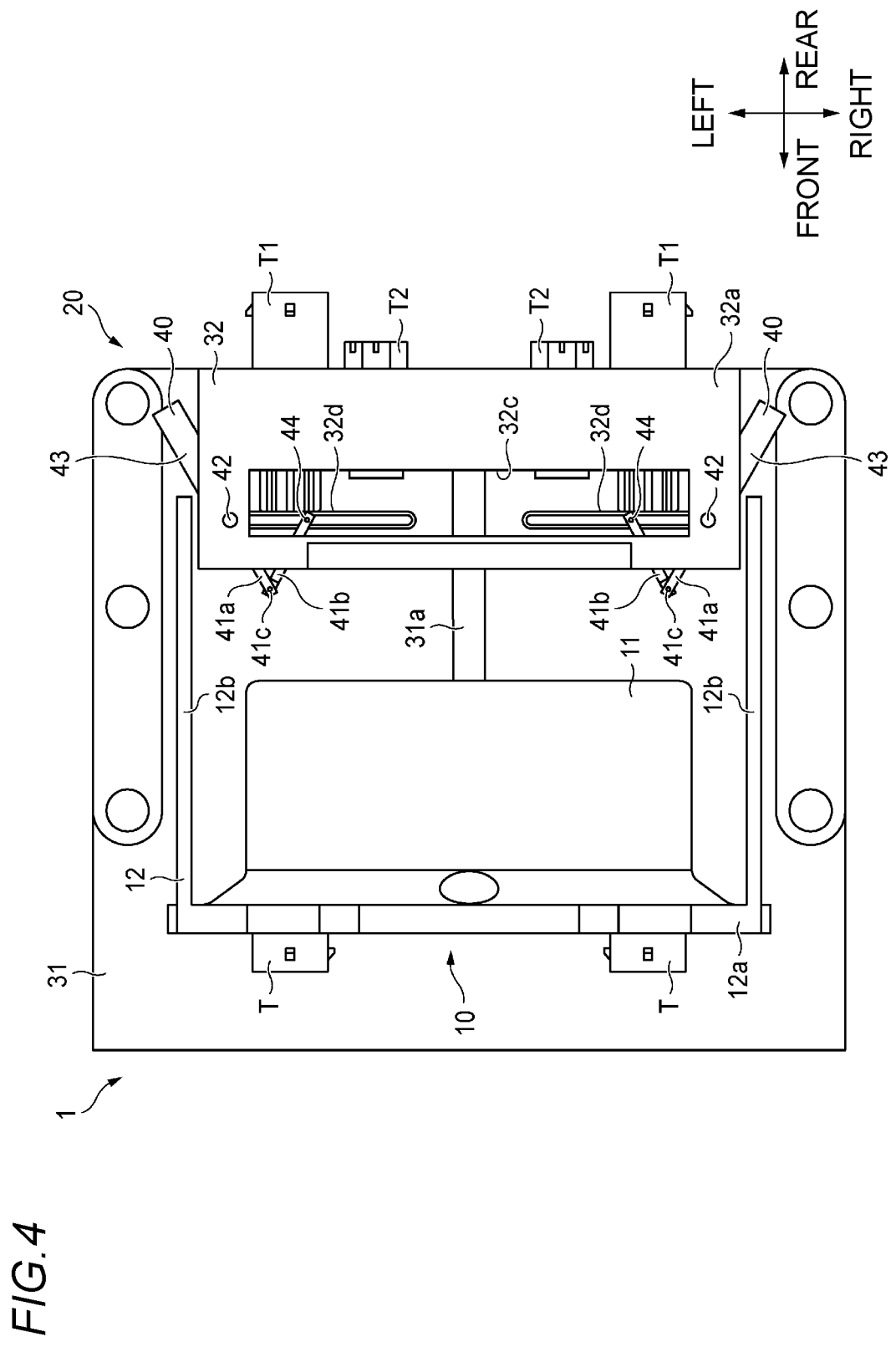
FIG. 4 is a bottom view showing the first connector and the second connector during fitting.
Figure 5:
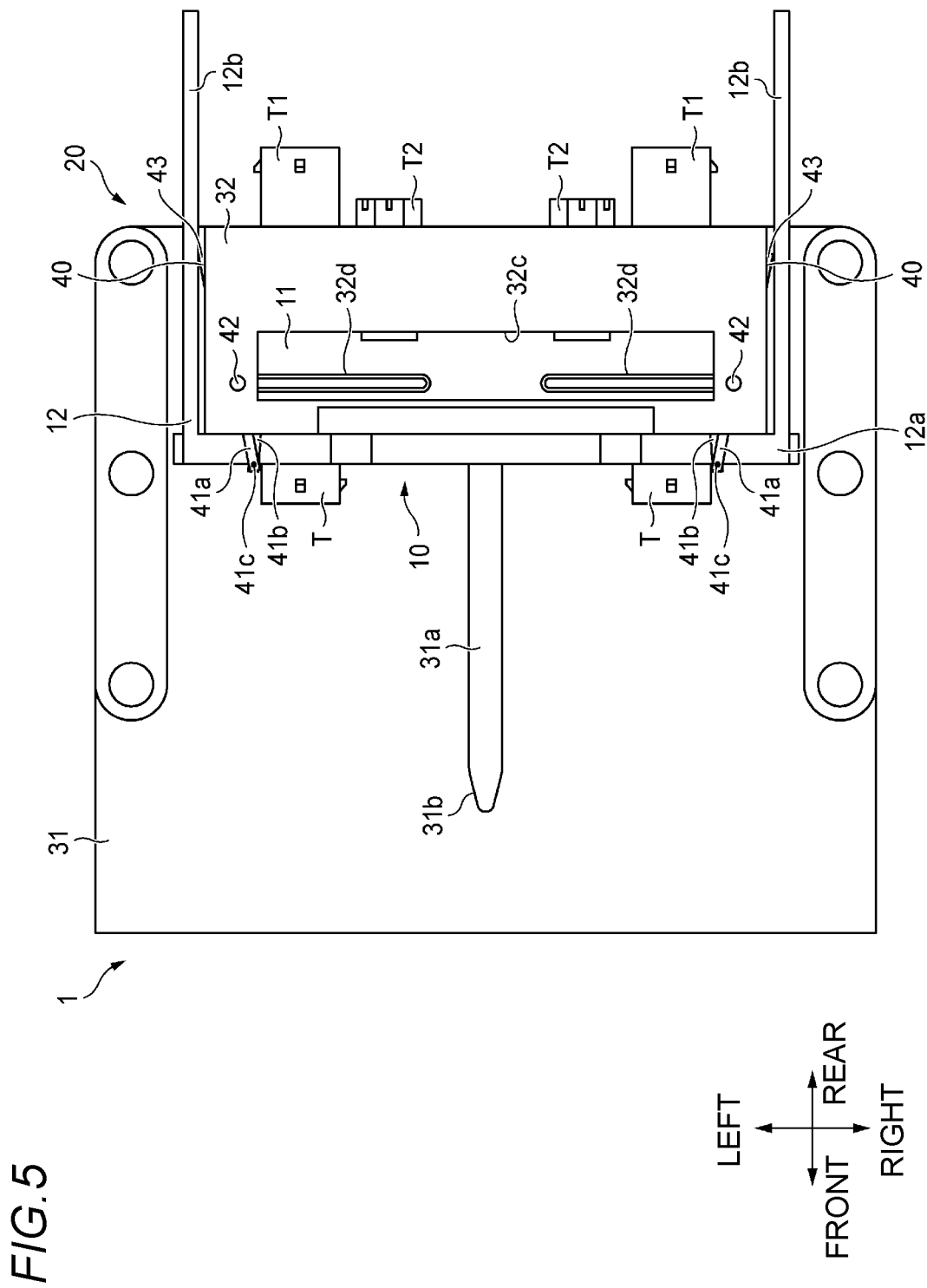
FIG. 5 is a bottom view showing the first connector and the second connector after fitting.
Figure 6:
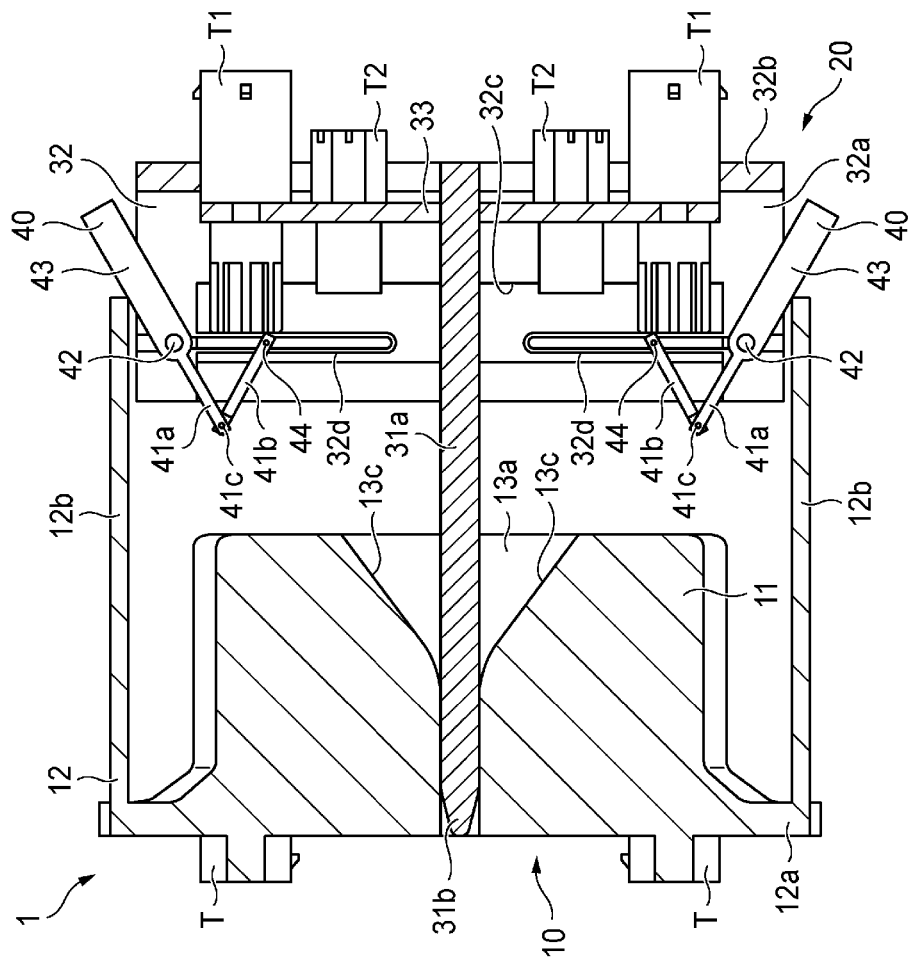
FIG. 6 is a cross-sectional view showing the first connector and the second connector during fitting.

Fitting of the first connector 10 and the second connector 20 will be described with reference to FIGS. 3 to 6. FIGS. 3 to 5 are bottom views showing each state of the first connector 10 and the second connector 20 before, during, and after fitting. FIG. 6 is a cross-sectional view showing the first connector 10 and the second connector 20 during fitting, and shows a state cut by a plane extending in the front-rear direction and the left-right direction immediately below the upper housing 31. In the drawings after FIG. 3, the electric wires W1 and W connected to the terminals T1 and T are not shown.

As shown in FIG. 3, in a state where the first connector 10 and the second connector 20 are not fitted to each other, the caps 40 are arranged along the left-right direction on the front surfaces of the terminals T1 and T2 of the second connector 20. The cover portion 41 is sized so that the first cover portion 41a and the second cover portion 41b cover the terminals T1 and T2 to prevent exposure of these terminals while the front surfaces of the terminals T1 and T2 are closed. The fitting of the first connector 10 and the second connector 20 is started from a state where the projecting portions 12b of the first connector 10 are directed toward the second connector 20 as shown in FIG. 3.

When the first connector 10 and the second connector 20 are relatively moved, the convex portion 31a of the second connector 20 enters the concave portion 13 of the first connector 10 and is guided by the hypotenuse portions 13c and the side wall portions 13b of the concave portion 13, so that the fitting of the first connector 10 and the second connector 20 proceeds. In this case, the front end portion 31b of the convex portion 31a abuts on the bottom portion 13a, so that inclination in the up-down direction during fitting is corrected. When the fitting direction is inclined in the left-right direction, the front end portion 31b of the convex portion 31a is guided between the left and right side wall portions 13b while abutting on the hypotenuse portions 13c of the concave portion 13, so as to be corrected to a correct fitting direction (see FIG. 6).

As shown in FIG. 4, the first connector 10 and the second connector 20 come close to each other, and when the contact portion 43 of the cover portion 41 is pressed backward by the projecting portion 12b of the first connector 10, the first cover portion 41a rotates around the shaft pin 42 in a direction away from the terminal T1. As the first cover portion 41a rotates, the rail pin 44 slides along the rail 32d in a direction close to the shaft pin 42 via the cap pin 41c and the second cover portion 41b. In this way, in the cap 40, the first cover portion 41a and the second cover portion 41b are folded via the cap pin 41c, and the terminal T2 covered by the second cover portion 41b is exposed.

In a state shown in FIG. 4, when the contact portion 43 is further pushed backward by the projecting portion 12b, the first cover portion 41a rotates around the shaft pin 42 in the direction away from the terminal T1. As the first cover portion 41a rotates, the rail pin 44 slides along the rail 32d in the direction close to the shaft pin 42 via the cap pin 41c and the second cover portion 41b. In this way, the first cover portion 41a further rotates around the shaft pin 42, whereby the second cover portion 41b is folded so as to be close to the first cover portion 41a via the cap pin 41c, and the terminal T1 covered by the first cover portion 41a is also exposed. That is, the front surfaces of the terminals T1 and T2 of the second connector 20 are opened (see FIG. 5), and the terminals T1 and T2 of the second connector 20 are inserted into the housing 11 of the first connector 10 and then connected to the terminal T of the first connector 10.

When the first connector 10 and the second connector 20 are separated from each other from a state shown in FIG. 5 where the front surfaces of the terminals T1 and T2 are exposed (open state), connections between the plurality of terminals T, T1 and T2 are released, and the pressing on the contact portion 43 by the projecting portion 12b is released. When the pressing by the projecting portion 12b is released, an urging force of the torsion coil spring 41d causes the first cover portion 41a to rotate around the shaft pin 42 in a direction close to the terminal T1. As the first cover portion 41a rotates, the rail pin 44 slides along the rail 32d in a direction away from the shaft pin 42 via the cap pin 41c and the second cover portion 41b. In this way, the first cover portion 41a rotates around the shaft pin 42, whereby the second cover portion 41b is extended so as to be separated from the first cover portion 41a via the cap pin 41c, and the cap 40 is closed so that the cover portion 41 covers the front surfaces of the terminals T1 and T2. The urging force of the torsion coil spring 41d allows the cap 40 to be opened only when necessary.

As described above, according to the connector 1 of the present embodiment, the projecting portion 12b presses the contact portion 43 with the fitting of the first connector 10 and the second connector 20. When the contact portion 43 is pressed, the cap 40 is folded and opened so that the second cover portion 41b comes close to the first cover portion 41a via the cap pin 41c. Therefore, a stroke (size) of the first connector 10 should beset as long as an end portion (cap pin 41c) of the first cover portion 41a of the cap 40 and a rear end portion of the housing 11 of the first connector 10 do not interfere with each other.

FIGS. 8A and 8B are explanatory diagrams for comparing a connector according to a reference example and the connector 1 of the present embodiment. In FIG. 8A, instead of the cap 40 of the second connector 20, a cap 140 having a non-foldable structure is shown by a broken line as a reference example. A shape and a size of the cap 140 in the reference example are the same as the shape and the size of the cap 40 in the closed state. In FIG. 8B, a projecting portion 112b of the first connector 10 when the cap 140 of the reference example is used is shown by a broken line. In the cap 140, an extra gap D1 is required as compared with the cap 40 having the foldable structure in order to avoid interference between the rear end portion of the housing of the first connector 10 and the cap 140. Therefore, as shown in FIG. 8B, it is necessary to increase a length of the projecting portion 12b by a size D2 corresponding to the gap D1. In contrast, by using the cap 40 having the foldable structure of the present embodiment, the length of the projecting portion 12b can be reduced by a size D2 corresponding to the gap D1 as compared with the reference example.

The present disclosure is not limited to the embodiment described above, and modifications, improvements, and the like can be made as appropriate. In addition, materials, shapes, dimensions, numerical values, forms, numbers, arrangement locations, and the like of components in the embodiment described above are optional and are not limited as long as the present disclosure can be achieved. In the above embodiment, an example in which the cap 40 is folded in half at the cap pin 41c is shown, but the cap may have a foldable structure, and is not limited to folding in half, and may have a structure that can be bent at two or more places (bellows structure). In the above embodiment, the caps 40 are provided on both the left and right sides of the housing 30, but a cap having a foldable structure may cover all the terminals.

According to a first illustrative aspect of the present disclosure, a connector (1) includes: a first connector (10); and a second connector (20), the connector (1) being configured by the first connector (10) and the second connector (20) which are fitted and electrically connected to each other. The first connector (10) includes a projecting portion (12b) extending toward the second connector in a fitting direction of the first connector (10) and the second connector (20). The second connector (20) includes: a terminal (T1, T2) extending in the fitting direction, a cap (40) including a cover portion (41) that covers a front surface of the terminal (T1, T2), a rotating shaft (shaft pin 42) provided on an edge portion of the cover portion (41), and a contact portion (43) extending to an opposite side to the cover portion (41) from the rotating shaft (42) and abutable on the projecting portion (12b), a housing (upper housing 31, lower housing 32) that supports the rotating shaft (42), and a rail pin (44). The cover portion (41) includes a first cover portion (41a) provided with the rotating shaft (shaft pin 42), a second cover portion (41b) adjacent to the first cover portion (41a) and provided with the rail pin (44), and a connection portion (cap pin 41c) that rotatably connects the first cover portion (41a) and the second cover portion (41b) to each other. The housing (lower housing 32) includes a rail (32d) extending in a direction intersecting with the fitting direction. The rail pin (44) is configured to move along the rail (32d) in response to the contact portion (43) being pressed and/or released by the projecting portion (12b).

According to the connector of the first illustrative aspect, the cover portion of the cap is made bendable at the connection portion, and when the contact portion is pressed, the first cover portion rotates around the rotating shaft in a direction away from the terminal. Following the rotation of the first cover portion, an edge portion to which a cap pin is attached of the second cover portion rotates. In this case, a side opposite to the second cover portion (a side to which the rail pin is attached) moves in a direction close to the shaft pin as the rail pin moves along the rail. In this way, since the cap folds and open at the connection portion, a stroke (size) of the first connector should be set as long as the connection portion of the cap and a terminal accommodating wall of the first connector, for example, do not interfere with each other.

In a case where the cap is not a foldable structure, it is necessary to set a size of the projecting portion of the first connector so that the terminal accommodating wall of the first connector and an end of the cap do not interfere with each other. In contrast, in the first illustrative aspect in which the cap has the foldable structure, the size of the projecting portion of the first connector may be set so that the connection portion of the cap and the terminal accommodating wall do not interfere with each other. As an example, when the connection portion of the cap is provided between a pin mounting position and a tip on the cap, the size of the projecting portion can be reduced by a size corresponding to approximately half a distance between the pin mounting position and the tip.

According to a second illustrative aspect of the present disclosure, the second connector (20) may further include an urging member (torsion coil spring 41d) that urges the cap (40) in a closing direction.

According to the connector of the second illustrative aspect, since the cap is urged in the closing direction, the cap is maintained to be closed when not being pressed by the projecting portion. After the contact portion is pressed by the projecting portion to open the cap, the cap is closed when pressure by the projecting portion is released. That is, the cap can only be opened when necessary.

The present disclosure can provide a connector with an openable and closable cap capable of reducing a space required for a stroke of the connector.

What is claimed is:
1. A connector, comprising:
a first connector; and
a second connector, wherein
the connector is configured by the first connector and the second connector which are fitted and electrically connected to each other,
the first connector includes a projecting portion extending toward the second connector in a fitting direction of the first connector and the second connector,
the second connector includes:
a terminal extending in the fitting direction,
a cap including a cover portion that covers a front surface of the terminal, a rotating shaft provided on an edge portion of the cover portion, and a contact portion extending to an opposite side to the cover portion from the rotating shaft and abutable on the projecting portion,
a housing that supports the rotating shaft, and
a rail pin,
the cover portion includes a first cover portion provided with the rotating shaft, a second cover portion adjacent to the first cover portion and provided with the rail pin, and a connection portion that rotatably connects the first cover portion and the second cover portion to each other,
the housing includes a rail extending in a direction intersecting with the fitting direction, and
the rail pin is configured to move along the rail in response to the contact portion being pressed and/or released by the projecting portion.

2. The connector according to claim 1, wherein the second connector further includes an urging member that urges the cap in a closing direction.

* * * * *